United States Patent Office 2,784,100
Patented Mar. 5, 1957

2,784,100

CALCIUM CYCLAMATE TABLET AND PROCESS OF MAKING THE SAME

Clarence J. Endicott and Edward R. Dalton, Waukegan, Ill., assignors to Abbott Laboratories, North Chicago, Ill., a corporation of Illinois No Drawing. Application March 1, 1955,
Serial No. 491,531

9 Claims. (Cl. 99—141)

This invention relates to a tablet containing calcium cyclamate as a sweetening agent. The invention also relates to a method for making such a tablet.

The calcium and sodium salts of cyclohexyl sulfamic acid (cyclamate, sold by Abbott Laboratories under the name Sucaryl) are well-known sweetening agents which enjoy wide-spread usage as a non-caloric sweetening agent in foods and beverages. Calcium cyclamate is somewhat to be preferred over the sodium salt for widespread usage because many overweight people who use the cyclamates also find it desirable to limit their sodium intake. Unfortunately for these people, up to the present time tablets of calcium cyclamate were never available and the consumers were being denied this convenient form of the preferred artificial sweetening agent.

Sodium cyclamate can be made into tablets according to well-known procedures and by the use of the standard high speed tabletting machines, and tablets of sodium cyclamate have been available from the earliest introduction of the product. Calcium cyclamate, on the other hand, could not be formulated into a tablet of convenient size because the material could not be compressed satisfactorily on standard high speed tabletting machines. While the exact reason that calcium cyclamate could not be satisfactorily tabletted is not fully known, it is believed that the crystalline characteristics of calcium cyclamate are such that the material will not compress satisfactorily in high speed tabletting equipment. Calcium cyclamate, in the usual tablet formulation, tends to bridge and stick in the tablet punches and the tablets themselves have a tendency to cap and crumble. The problem remained unsolved prior to the advent of the present discovery in spite of the concentrated efforts of experts in the tabletting art.

It is therefore a principal object of this invention to provide a tablet of calcium cyclamate which overcomes the problems heretofore recited.

Another object of the invention is to provide a tablet comprising calcium cyclamate which can be produced on standard high speed tabletting machines.

In the accomplishment of the foregoing objects and in accordance with the practice of this invention there is now provided a composition suitable for tabletting on high speed tabletting machines which comprises calcium cyclamate and critical amounts of a high melting polyethylene glycol and acacia. It is found in the practice of the invention that when high melting polyethylene glycol is employed in an amount between about 1% and 4% by weight of the tablet, and acacia is employed in an amount at least about .7 parts by weight for each part by weight of calcium cyclamate, that a highly satisfactory tablet is obtained.

If more or less than the critical amounts of the two additives is employed, the result will be a composition which will not compress satisfactorily in standard high speed tabletting machines, and will result in a tablet which will have properties making it undesirable for presentation to the public. For example, if less than the indicated critical amount of high melting polyethylene glycol is employed, the composition will stick and bridge in the tabletting machine and the tablet will have a tendency to cap. If more than the indicated critical amount is used, the tablets will have a greasy or waxy appearance. If less than the indicated critical amount of acacia is used, the composition again will tend to stick in the tabletting machines. It will be apparent that the amount of acacia may be increased far above the indicated minimum amount since acacia is a known tablet adjuvant and extender. The upper limit on the amount of acacia added will be dictated only by the size of the desired tablet. There is no reason why two or three parts by weight of acacia per part of calcium cyclamate cannot be used provided the tablet does not become too large in size and too inconvenient to package.

From the foregoing discussion it will be apparent that three critical components are required in the preparation of the tabletted calcium cyclamate. Other components may be added at the discretion of the compounder without substantially affecting the properties of the tablet. For example, it is customary in this type of tablet to employ an agent which will speed up the disintegration of the tablet in liquid. An effervescent disintegrator is usually employed although non-effervescent solubilizing agents such as sodium carboxymethyl cellulose are known for this purpose. Sufficient disintegrator will ordinarily be added to cause the tablet to break up rapidly in aqueous medium. Since it is desirable to have the tablet disintegrate as rapidly as possible, the largest amount of disintegrator which can be added without making the tablet too bulky will be used. The result of reducing the amount of disintegrator is merely to lengthen the time required for the tablet to break up in aqueous medium. Hence, even a small amount of disintegrator will be desirable provided it is sufficient to hasten the breaking up of the tablet.

Effervescent disintegrators are well known in the pharmaceutical art and it is contemplated that any suitable system may be employed. It will be desirable, of course, to use a disintegrator which does not contain sodium ions but sodium ions are not completely ruled out in the disintegrator system. Ordinarily one will employ an alkali metal or alkaline earth metal carbonate as the basic element of the effervescent system, such as calcium carbonate, potassium carbonate, potassium bicarbonate and ammonium carbonate. The edible organic acids are especially suitable although any weak non-toxic acid may be employed. Citric acid, tartaric acid, potassium dihydrogen phosphate and glycine hydrochloride are representatives of this group.

Other non-caloric sweetening agents may also be added to the combination if desired. For example, one may wish to add calcium saccharin to the combination to enhance the sweetness thereof and such addition does not substantially alter the physical characteristics of the product. Saccharin will customarily be added in about 0.1 part by weight per part of calcium cyclamate although as much as 0.3 or 0.4 part by weight may be used and of course amounts smaller than 0.1 part by weight may obviously be employed.

The polyethylene glycol is referred to herein as one having a high melting point. By this is meant more precisely that the polyethylene glycol should be a waxy solid, preferably having a melting or softening point above about 50° C. The polyethylene glycols having an average molecular weight between about 3500 and 2,000 fall within this class and two commercial items known as Carbowax 4000 and Carbowax 6000 are found suitable.

The following examples are given in order to define the invention more precisely but it is to be understood that the examples are not intended as a limitation of the invention in any way.

Example I 104,000 tablets were prepared according to the following directions, each tablet containing 50 mg. of calcium cyclamate:

| | Lbs. |
|---|---|
| Sucaryl calcium (calcium cyclamate, Abbott Laboratories) | 11.46 |
| Acacia | 9.68 |
| Carbowax 6000 (polyethylene glycol) | 1.14 |
| Potassium bicarbonate | 12.01 |
| Citric acid | 8.01 |
| Saccharin calcium | 1.146 |

The Sucaryl calcium is passed through a 30-mesh screen and spread out in drying trays. The same is done to each of the other ingredients except the Carbowax and all are dried at 130° F. for 18 hours. The Carbowax is passed through an 80-mesh screen and combined with all the other ingredients after drying. All of the ingredients are thereafter passed through a 30-mesh screen again and the mixture of ingredients is thoroughly blended. The granulation thus prepared is compressed on $5/16''$ grooved punches using No. 4 dies at a machine speed of 87,000 tablets per hour. Ten of the tablets thus prepared weighed 29.24 grs. and had a thickness of 0.101''. The tablets had a disintegration time of 1 minute 15 seconds at 50° C. and 2 minutes 25 seconds at 25° C. The tablets were sufficiently hard to resist breakage under normal handling conditions.

Example II

Tablets containing 50 mg. of calcium cyclamate each are prepared according to the following directions:

| | Grams |
|---|---|
| Sucaryl calcium (calcium cyclamate, Abbott) | 100 |
| Carbowax 6000 (polyethylene glycol) | 1.86 |
| Acacia | 85 |

The Sucaryl calcium and the acacia are passed through a 30-mesh screen and are thoroughly dried. The Carbowax is passed through an 80-mesh screen and combined with the other ingredients after drying. All ingredients are again passed through a 30-mesh screen and the mixture of ingredients is thoroughly blended. The granulation thus prepared is compressed into tablets of a size so that each tablet contains 50 mg. of calcium cyclamate.

Example III

Tablets containing 50 mg. of calcium cyclamate each are prepared according to the following directions:

| | Lbs. |
|---|---|
| Sucaryl calcium (calcium cyclamate, Abbott) | 11.46 |
| Acacia | 9.68 |
| Carbowax 6000 (polyethylene glycol) | 1.75 |
| Potassium bicarbonate | 12.01 |
| Citric acid | 8.01 |
| Saccharin calcium | 1.146 |

The granulation is prepared in accordance with the instructions given in Example I and tablets each containing 50 mg. of calcium cyclamate were compressed from the granulation.

Example IV

Tablets containing 50 mg. of calcium cyclamate are prepared according to the following directions:

| | Grams |
|---|---|
| Sucaryl calcium (calcium cyclamate, Abbott) | 100 |
| Acacia | 70 |
| Carbowax 6000 (polyethylene glycol) | 4.25 |

The ingredients are prepared and tested according to the directions given in the preceding examples and compressed tablets each containing 50 mg. of cyclamate are prepared.

Example V 50 mg. tablets of calcium cyclamate are prepared according to the following directions:

| | Grams |
|---|---|
| Sucaryl calcium (calcium cyclamate, Abbott) | 100 |
| Acacia | 85 |
| Carbowax 6000 (polyethylene glycol) | 10 |
| Potassium bicarbonate | 120 |
| Citric acid | 80 |
| Saccharin calcium | 33.3 |

The ingredients are prepared and are tabletted in accordance with the procedure outlined in Example I.

Others may practice this invention in any of the numerous ways which will be suggested to one skilled in the art upon a reading of this disclosure. All such practice of this invention is considered to be covered hereby provided it falls within the scope of the appended claims.

We claim:

1. A composition suitable for tabletting on high speed tabletting machines which comprises one part by weight of calcium cyclamate, at least about 0.7 part by weight of acacia and from 1% to 4% by weight of high melting waxy polyethylene glycol based on the total weight of the tablet.

2. The method of tabletting calcium cyclamate which comprises combining with said calcium cyclamate for each part by weight thereof at least about 0.7 part by weight of acacia and from about 1% to about 4% by weight of a high melting waxy polyethylene glycol based on the weight of the tablet ingredients, blending the ingredients and compressing said ingredients into a tablet.

3. A tablet which comprises one part by weight of calcium cyclamate, at least about 0.7 part by weight of acacia and from 1% to 4% by weight based on the total weight of the tablet of a polyethylene glycol melting above about 50° C.

4. A composition suitable for tabletting on high speed tabletting machines which comprises one part by weight of calcium cyclamate, about 0.85 part by weight of acacia and about 2.5% by weight based on the total weight of the tablet of a polyethylene glycol melting above about 50° C.

5. A tablet which comprises one part by weight of calcium cyclamate, about 0.85 part by weight of acacia and about 2.5% by weight based on the total weight of the tablet of a polyethylene glycol melting above about 50° C.

6. A tablet which comprises one part by weight of calcium cyclamate, at least about 0.7 part by weight of acacia, from 1% to 4% by weight based on the total weight of the tablet of a polyethylene glycol melting above about 50° C. and not more than about 0.4 part by weight of saccharin.

7. A tablet which comprises one part by weight of calcium cyclamate, about 0.85 part by weight of acacia, about 2.5% by weight based on the total weight of the tablet of a polyethylene glycol melting above about 50° C. and about 0.1 part by weight of saccharin.

8. A tablet which comprises one part by weight of calcium cyclamate, about 0.85 part by weight of acacia, about 2.5% by weight based on the total weight of the tablet of a polyethylene glycol melting above about 50° C. and sufficient effervescent disintegrator to materially speed up disintegration of the tablet in water.

9. A tablet which comprises one part by weight of calcium cyclamate, about 0.85 part by weight of acacia, about 2.5% by weight based on the total weight of the tablet of a polyethylene glycol melting above about 50° C., about 0.1 part by weight of saccharin and sufficient effervescent disintegrator to materially speed up disintegration of the tablet in water.

References Cited in the file of this patent

UNITED STATES PATENTS

| | | |
|---|---|---|
| 2,311,235 | Kuderman | Feb. 15, 1943 |
| 2,698,822 | Halpern et al. | Jan. 4, 1955 |

OTHER REFERENCES

"Journal of the American Medical Association," vol. 1143, No. 7, 1950, page 13 adv.

"Tablet Making," by Little et al., published by The Northern Publishing Co., Ltd., 37 Victoria Street, Liverpool, England, 1949, pages 34 and 48.